May 25, 1943.　　　V. G. VAUGHAN　　　2,320,252
THERMOSTATIC PROTECTIVE CIRCUIT
Filed Jan. 24, 1941　　　2 Sheets-Sheet 2

Victor G. Vaughan
Inventor
Haynes and Koenig
Attorneys

Patented May 25, 1943

2,320,252

UNITED STATES PATENT OFFICE 2,320,252

THERMOSTATIC PROTECTIVE CIRCUIT

Victor G. Vaughan, Attleboro, Mass., assignor to Metals & Controls Corporation, Attleboro, Mass., a corporation of Massachusetts Application January 24, 1941, Serial No. 376,556

4 Claims. (Cl. 172—279)

This invention relates in general to thermostatic protective circuits, and, more particularly, to thermostatic circuits for the protection of electrical motors against overheating.

An object of this invention is to provide for the protection of motors by means of thermostatically controlled switches. Another object of this invention is to provide an improved method of connecting a protective thermostatic switch into the circuit of a motor in such manner as to increase the electrical rating of the switch over that previously obtained in other methods of connecting it. Another object of this invention is to provide a method of connecting a thermostatic switch into the circuit of a motor, in such manner as to give ample protection thereto against overheating from excessive current and voltage conditions. Another object of this invention is to provide a combination of a thermal-overload protector switch and a magnetic starting switch for a motor in such manner that the thermal-overload protector switch has a higher effective rating than that previously obtained in other methods of connecting it into the motor circuit. Another object of this invention is the provision of a method of protecting a split-phase electrical motor which allows the use of a thermal switch of smaller electrical rating than previously used. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Referring now to the drawings, in which are illustrated several of the possible embodiments of the invention, Fig. 1 shows schematically a circuit of the present invention;

Similar reference characters indicate corresponding parts throughout the several views of the drawings.

Figure 1:
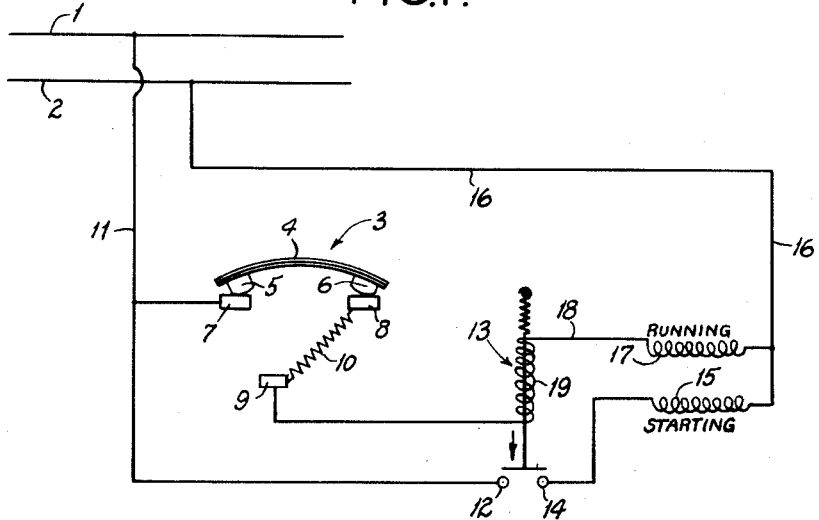

It is becoming common practice to apply thermostatic switches in the circuits of electrical motors in order to prevent them from burning out, due to overloading or excessive current conditions. Thermostatic switches have been applied to motors in several ways to function so that if the motor becomes overheated through excessive loads, or if the motor draws more current than it should because of high voltage of current conditions, the thermostatic switch will act to disconnect the motor from the circuit, thus preventing the motor from overheating and burning out.

In connection with certain types of motors, where both starting and running windings are used, it has sometimes been the practice to use an electromagnetic type of starting switch (in order to control the starting winding) in combination with a thermal-overload protector through which latter pass both the starting-winding current and the running-winding current. The current in the running winding also passes through the coil of the electromagnetic starting relay. In devices of this type, when the switch is closed to the running winding, the starting-winding switch (which is normally open is closed by means of the electromagnetic relay. As the rotor of the motor picks up speed, the back electromotive force of the motor in the running winding decreases the current traversing the running winding and the coil of the electromagnetic relay, until such point is reached that the relay is no longer able to hold the starting switch closed. At this point the starting winding is disconnected from the source of power. These electromagnetic relays are designed for the various type motors and their construction is not a part of this invention.

The particular design of the thermostatic switch used as an overload protector is also not a part of this invention, and any of the common forms can be used; for example, either those employing a thermostatic strip, or those employing a snap-acting thermostatic disc such as shown in the John D. Bolesky United States Patents 2,199,387 and 2,199,388. Briefly described, a switch of this latter type, which is preferred for use in the present invention, comprises an electrical insulating base on which is mounted at its center a snap-acting disc of the type shown and described in the John A. Spencer United States Patent 1,448,240. Contact buttons are welded to the snap-acting disc at diametrically opposite points on its periphery. These contact buttons cooperate with stationary contacts, mounted on the thermostat base, to open and close and electrical circuit as the disc is snapped from one position of convexity to its oppositely curved position when heated and cooled. If desired, for certain applications, a third stationary contact is provided on the base and a connection is made between this third contact and one of the other stationary contacts by means of an electrical-resistance wire which serves as a heater wire to heat the disc when current is passed therethrough. However, it is not necessary to use this disc type of thermostat since a properly designed thermostat using a strip of bimetal fastened at one end and with a movable contact at its other end cooperating with a fixed contact can also be used. If necessary, a heater wire can be incorporated with this last-named thermostat to adjust its operating values to the correct values for the motor it is designed to protect.

In some types of motors using a starting winding and a running winding, the locked-rotor current through the running winding is only a part of the total locked-rotor current in running and starting windings. For example, in a 1 H. P. motor, the locked-rotor current in the running winding may be as much as 45 amperes, the locked-rotor current in the starting winding may be as high as 35 amperes, and the combined locked-rotor current for the two may run as high as 75 amperes. Hitherto, it has been common practice to place the motor-protection thermostat ahead of both motor windings in the line so that the thermostat had to carry the full combined value of the locked-rotor current in the running and starting windings, in this case 75 amperes. This requires a thermostat having a relatively high rating, and in some cases, such as in the integral horsepower sizes, the large rating needed may lead to expensive construction, special contact materials, special heater wires, and bulky size. In this invention, I propose to so connect the thermostat that such a high rating is not needed, thus doing away with the disadvantages enumerated above.

Referring now to the drawings, Fig. 1 illustrates schematically a circuit employing my invention. Numerals 1 and 2 represent power lines which are connected to the motor. Numeral 3 indicates generally the thermal-overload protector comprising a snap-acting disc 4, movable contacts 5 and 6 mounted on disc 4, and stationary contacts 7 and 8 cooperating with contacts 5 and 6 to open and close the electrical circuit, and stationary contact 9. The heater wire 10 for the thermostat is connected between stationary contacts 8 and 9. Such a switch is fully described in the aforesaid Patents Nos. 2,199,387 and 2,199,388.

In my invention, power line 1 is connected by means of wire 11 to stationary contact 7 of the thermo-electric overload-protecting switch, and to contact 12 of an electromagnetic relay indicated generally at 13. Relay 13 is of any type having its contacts open when no current is flowing through the relay coil 19. The other contact 14 of the electromagnetic relay is connected to the starting winding 15 on one side thereof. The other side of the starting winding 15 is connected both to power line 2 by means of wire 16, and to one end of running winding 17. The other end of running winding 17 is connected by means of wire 18 to one side of relay coil 19. The other side of relay coil 19 is connected to stationary contact 9. It is to be observed that current flows to the starting winding 15 directly from power line 1 through the contacts 12 and 14 of the electromagnetic relay 13 and back to power line 2. Current flows to the running winding 17 from power line 1 through wire 11 to stationary contact 7, movable contact 5, through disc 4, movable contact 6, stationary contact 8, heater wire 10, stationary contact 9, through relay coil 19, wire 18, running winding 17, and through wire 16 back to power line 2.

The operation of the device is as follows: The relay contacts 12 and 14 are normally open when no current is flowing through the circuit. When voltage is applied to the circuit, the current through the running winding 17 passes through the coil 19 of the electromagnetic relay. Since the rotor of the motor is stationary, the value of the current in the running winding and relay coil is at locked-rotor value and is sufficient to cause the relay to close its contacts 12 and 14. This places the starting winding across the power lines 1 and 2 and the motor starts. As the rotor picks up speed, the current through the running winding decreases in value due to the back electromotive force of the motor until it reaches such a low value that the relay coil 19 is no longer able to hold the contacts 12 and 14 closed. At this point, the relay contacts open, thus cutting the starting winding out of the circuit.

If, now, the motor is overloaded to the extent that a deleterious current begins to run through the running winding, this current passes through heater wire 10, and heats it up. It is also passing through the disc 4, and the combined heating effect on the disc is sufficient to cause disc 4 to open contacts 5—7 and 6—8 to break the circuit to the running winding. This cuts the motor completely off the circuit since now both the starting winding and the running windings are cut off. It will be noticed, however, that the thermostatic disc, the heater wire 10, and the contacts 5, 6, 7 and 8 need to be designed to withstand the locked-rotor current value of the running winding only.

As a second example of the operation of this circuit, if the power is turned on to the circuit and the motor refuses to start, it will be observed that the relay contacts 12 and 14 are closed. However, the current passing through the heater wire 10 and the disc 4 is sufficient to open the contacts 5—7, and 6—8, thus disconnecting both the relay coil and the running winding. This opens the relay contacts 12 and 14, disconnecting the starting winding from the circuit. Thus, the motor is completely disconnected from the power lines. In this case also, the thermostatic switch has been responsive to only the current in the running winding.

It will be observed that by the use of this circuit, a thermal-overload protector can be used to protect a motor whose combined current (locked-rotor value) of starting and running windings is much greater than the thermal-overload protector is designed to carry. For example, in the 1 H. P. example cited above, the thermal-overload protector need be designed to carry only 45 amperes. This means that the heater wire 10 and the contacts of the thermal-overload protector can be much smaller in size and the thermal protector can be more economically made, and still satisfactorily function to protect the motor. By hitherto known methods of using thermal-overload protection, the thermal-overload protection in this case would have had to withstand the full locked-rotor current value of 75 amperes.

Figure 2:
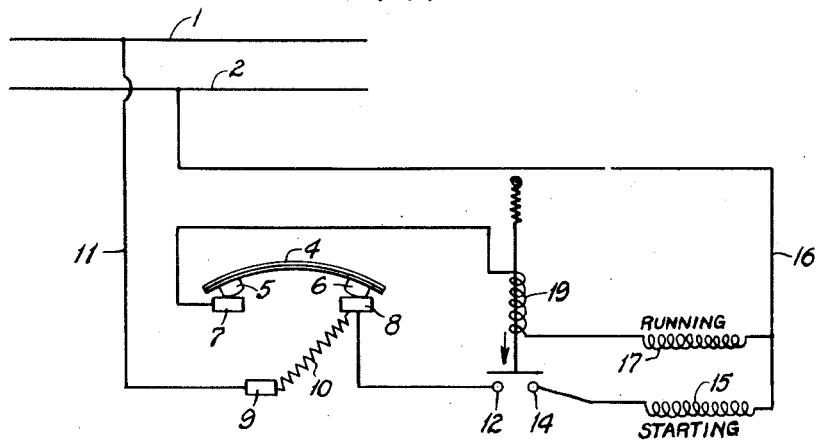
Fig. 2 shows an alternative form, schematically, of a circuit.

Fig. 2 shows an alternative form of the invention in which the heater wire 10 has been connected so it carries the combined running and starting-winding currents in the motor. In this case, the wire 11 from power line 1 is connected to stationary contact 9. Relay contact 12 is connected to stationary contact 8. Relay coil 19 is connected to stationary contact 7. It will be observed in this circuit that all of the power to the two windings must flow through the heater wire 10. In this case, the heater wire is designed to withstand the full locked-rotor current but the contacts can be rated at only the 45-ampere rating. Other ways of connecting the heater, or of using more than one heater, and still following the method of this invention, will be apparent and need not be detailed here.

If it is not desired to use the heater wire 10, it may be omitted in Fig. 1 by connecting the end of the relay coil 19 to the stationary contact 8 instead of to stationary contact 9. Similarly, in Fig. 2 by making the same change in the connection of wire 11.

Other types of thermostatic elements may be employed in carrying the present invention. For example, simple strip type creep acting thermostats or ambient compensated thermostats either snap-acting or creep acting may be used.

Figure 3:
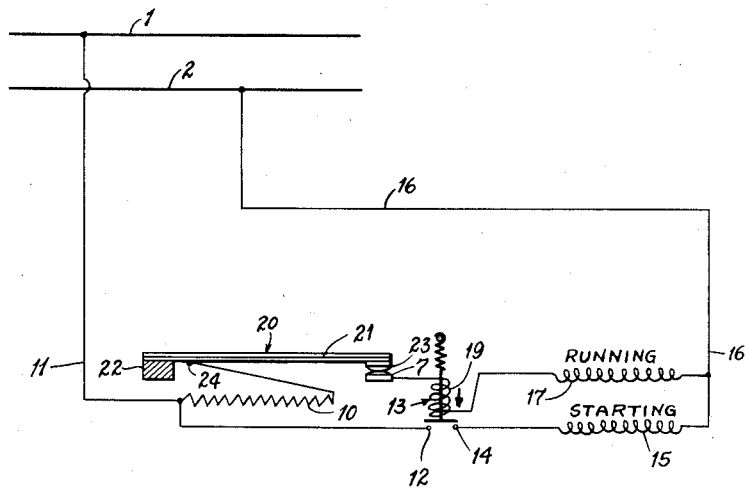
Fig. 3 shows a circuit similar to that of Fig. 1 but employing a different type of thermostatic element; and, Fig. 4 is a circuit similar to Fig. 2 but employs the thermostatic element shown in Fig. 3.

Fig. 3 illustrates a circuit embodying a creep acting strip type thermostat 20. This thermostat consists of a composite metal strip 21 attached at one end in any suitable manner such as shown at 22. The opposite or free end carries a movable contact 23 which cooperates with a stationary contact 7. Wires 11 and 16 are connected to power lines as before. Heater 10 however is connected to thermostatic element 21 preferably at a portion which is relatively free from movement as shown at 24. In this instance as in the embodiment as shown in Fig. 1 it will be noted that both the heater wire 10 and the contacts 7 and 23 need be designed only to carry part of the current, the remainder of the current passing through the relay contacts 12 and 14. The relay is controlled by the thermostatic element as in the Figs. 1 and 2 embodiments.

Figure 4:
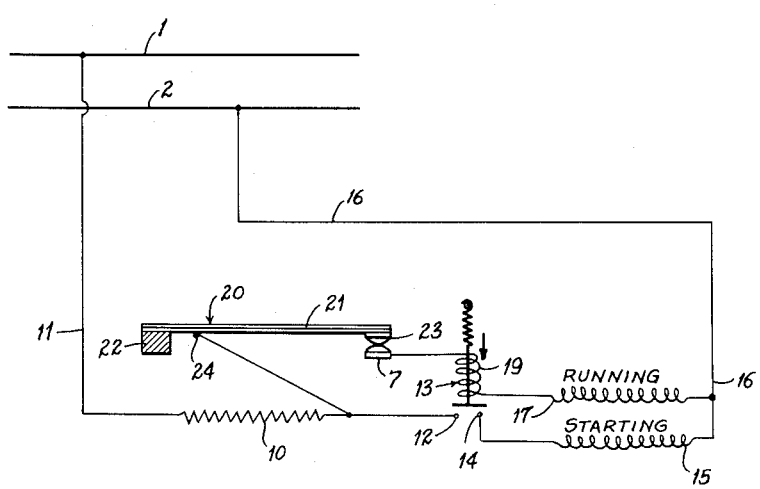

Fig. 4 illustrates a still further embodiment of the invention. It employs the creep acting strip type thermostat shown in Fig. 3 but the circuit connections are similar to Fig. 2. Here as in the Fig. 2 embodiment it will be noted that the heater 10 carries the entire current while as before the thermostatic contacts 7 and 23 carry only part of the current and can be designed accordingly.

The heater wire 10 may be omitted in the Figs. 3 and 4 construction if desired by making the changes suggested above in connection with Figs. 1 and 2.

By this invention it is possible to increase the current-carrying capacity of overload protectors applied to motors having both running and starting windings. A thermal-overload protector and an electromagnetic relay are combined with a motor or similar energy translating device in such manner that the thermal-overload protector carries only the current through one of the windings of the motor. Where suitable occasions arise, the invention may be applied to other forms of energy-translating devices: For example, three-phase systems where the protector need be designed to carry only the current in one or two of the phases.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:

1. In a motor starting circuit for a motor having running and starting windings in parallel across a supply circuit, a relay responsive to current in the running winding and having contacts in the circuit of said starting winding adapted under predetermined current values to close said contacts, and a thermostat responsive to current flowing to at least one of said motor windings, said thermostat comprising a thermostatic element having contacts only in the circuit of the running winding and carrying the current in said winding.

2. In a motor starting circuit for a motor having running and starting windings in parallel across a supply circuit, a relay responsive to current in the running winding and having contacts in the circuit of said starting winding adapted under predetermined current values to close said contacts and biased to open said contacts under current of less value, and a thermostat heated in response to current flowing to the running winding, said thermostat comprising a thermostatic element and a separate heater element carrying the current in at least one of said motor windings, said thermostatic element having contacts only in the circuit of the running winding.

3. In a motor starting circuit for a motor having running and starting windings in parallel across a supply circuit, a relay responsive to current in the running winding and having contacts in the circuit of said starting winding adapted under predetermined current values to close said contacts and biased to open said contacts under current of less value, and a thermostat heated in response to current flowing to the running winding, said thermostat comprising a thermostatic element and a separate current-carrying heater element, said thermostatic element having contacts only in the circuit of the running winding, and said heater element being also in the circuit of said running winding.

4. In a motor starting circuit for a motor having running and starting windings in parallel across a supply circuit, a relay responsive to current in the running winding and having contacts in the circuit of said starting winding adapted under predetermined current values to close said contacts and biased to open said contacts under current of less value, and a thermostat heated in response to current flowing to the running winding, said thermostat comprising a thermostatic element and a separate current-carrying heater element, said thermostatic element having contacts only in the circuit of the running winding, said heater element carrying current for both the running and starting windings.

VICTOR G. VAUGHAN.